Oct. 12, 1943. C. M. WILLIAMS Re. 22,384

CONTROLLED PUMPING CHOKE FOR OIL WELLS

Original Filed Jan. 25, 1940 2 Sheets-Sheet 1

INVENTOR.
CLARENCE M. WILLIAMS
BY U. G. Charles
ATTORNEY.

Oct. 12, 1943. C. M. WILLIAMS Re. 22,384

CONTROLLED PUMPING CHOKE FOR OIL WELLS

Original Filed Jan. 25, 1940 2 Sheets-Sheet 2

INVENTOR.
CLARENCE M. WILLIAMS
BY U. G. Charles
ATTORNEY.

Reissued Oct. 12, 1943

Re. 22,384

UNITED STATES PATENT OFFICE 22,384

CONTROLLED PUMPING CHOKE FOR OIL WELLS

Clarence M. Williams, Augusta, Kans.

Original No. 2,272,388, dated February 10, 1942, Serial No. 315,576, filed January 25, 1940. Application for reissue filed November 18, 1942, Serial No. 465,995

12 Claims. (Cl. 103—180)

My invention relates to a controlled pumping choke for oil wells and has for its principal object to maintain the natural rock pressure during the pumping or flowing period of the well.

A further object of my invention is to provide in the mechanism a needle valve adjustably controlled at the top of the well.

A still further object of my invention is to provide a simple and efficient means to automatically lock the mechanism against free longitudinal movement, whereby the reciprocating stroke of the pump rod is ineffective to release the mechanism.

A still further object of my invention is to utilize the annular space that is a conventional condition existing in oil well casings and pumping devices, said space being a depository for daily production, and said deposit being subject to renewal by the natural pressure of the well when the depository has been emptied by the pump action, thereby retarding water contamination of the oil.

A still further object of my invention is to provide a choke mechanism adaptable to standard oil well casings and standard pumping devices to work in conjunction therewith.

These and other objects will hereinafter be more fully explained, reference being had to the accompanying drawings forming a part of this specification, in which like characters will apply to like parts in the different views.

Referring to the drawings.

Figure 1:
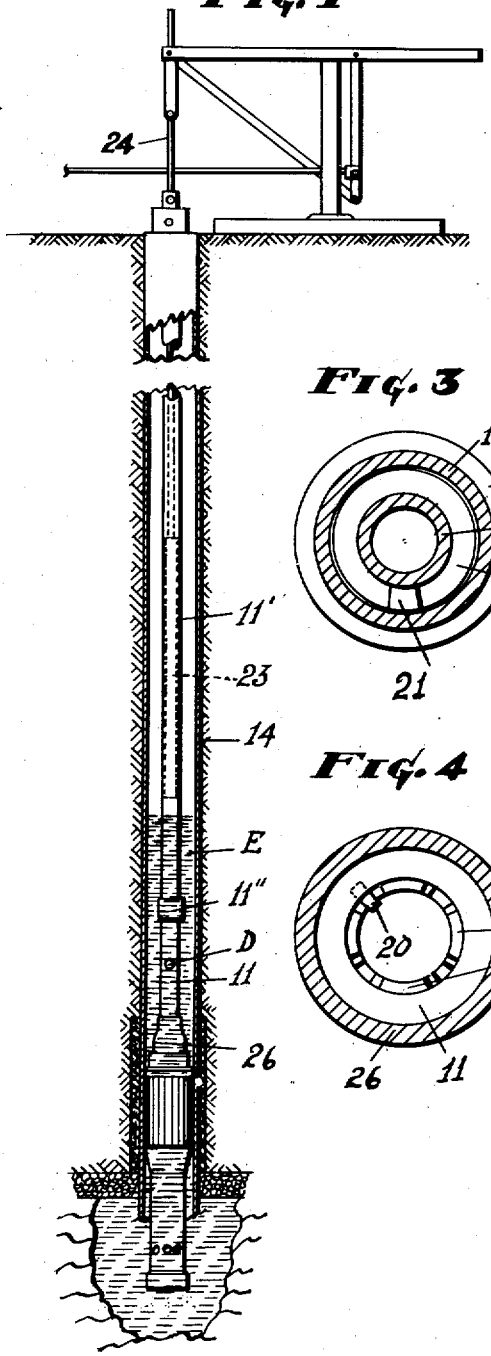
Fig. 1 is a sectional view through the casing of an oil well, parts being illustrated in elevation.
Figure 3:
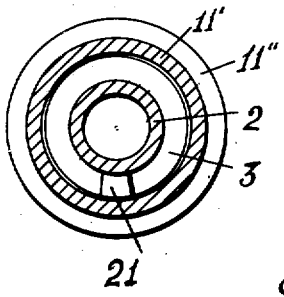
Fig. 3 is a sectional view taken on line 3—3 in Fig. 2.
Figure 4:
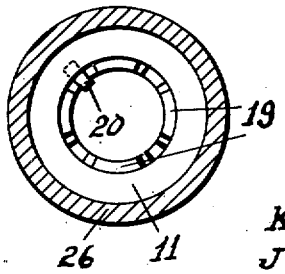
Fig. 4 is a sectional view taken on line 4—4 in Fig. 2.

My invention herein disclosed consists of a choke barrel structure comprising an upper section 1, the upper end of which is adapted to member with a pull tube 2, the abutting ends of each being threaded externally and being connected by a threaded coupling 3 fluid tight, the lower end of said section 1 being threaded externally to engage with a threaded end of a section 4 for longitudinal adjustment between said sections. To render the joint between said section 1 and section 4 fluid tight, a packing 5 tensioned by a gland nut 6 threadedly engages in the upper end of said section 4, and the said section 1 at its lower extremity has a head A centrally bored and threaded to receive the threaded stud B of a needle valve 7 axially positioned in the barrel of the choke for the purpose later described.

The said head A has a plurality of apertures 8 extending through and spaced around the axis of the head to function as an oil passage through the choke barrel, and the said section 4 has an exterior offset inward to receive a collar 9 slidably engaging thereon as separating means and retaining means for a pair of flexible cups 10 as oil tight sealing means between the choke barrel and a sleeve 11, in which said barrel is positioned, said sleeve 11 being connected to the oil conductor tubing 11′ through the medium of a coupling 11″.

A lower section 12 of said choke barrel at its upper extremity is reduced and threaded externally, aligned axially with section 4, and connected therewith by a coupling section 13, the end portions of which are interiorly threaded to function as a coupling for sections 4 and 12. The said coupling 13 is axially bored through the side walls oppositely to provide ports, as at C, each bore registering with corresponding bores which provide ports D in sleeve 11 whereby communication is arranged between the choke barrel and a storage or depository E within an oil well casing 14 that upwardly extends in the oil well, as shown in Fig. 1.

It will be seen that the upper end of said section 12 has a head 15 secured therein and axially bored conically as at F to conform to the conical point G of the needle 7 whereby said bore F may be closed or opened to a required amount, functioning as a choke for a predetermined flow through said bore of the head. There is also a guide for the lower extremity of the needle through the medium of an axially bored washer 7′ secured to the wall of the coupling 13 at or near the diametrical axis of the two bores through the wall thereof, and the said washer will function as a deflector, coacting with the choke control of the needle valve for an upward flow of the oil through the conical bore F. The retarding of the current flow of the oil, being so controlled, is means to skin the oil from water accumulating in the wall during action of the pump.

Figure 5:
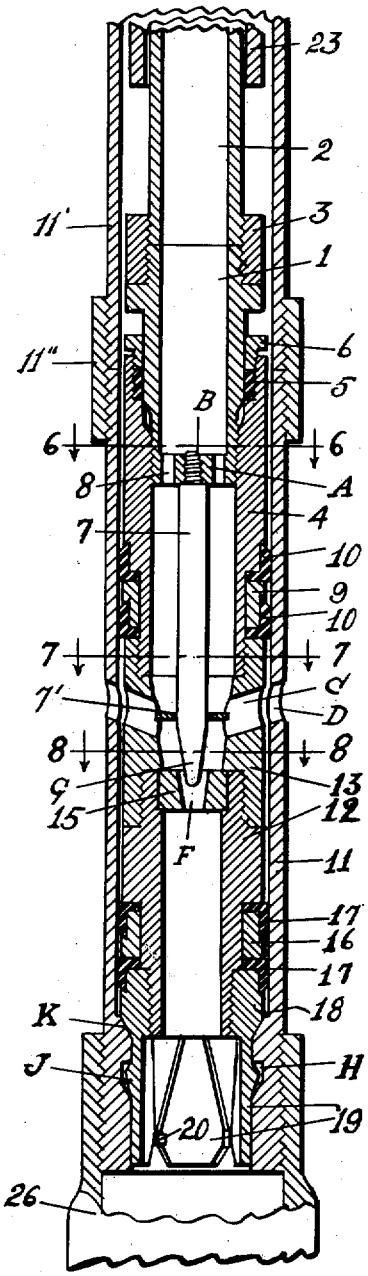
Fig. 5 is a sectional view through the oil conductor tubing, sleeve and choke mechanism.
Figure 6:
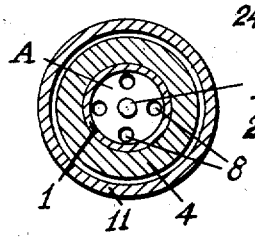
Fig. 6 is a sectional view taken on line 6—6 in Fig. 5.
Figure 7:
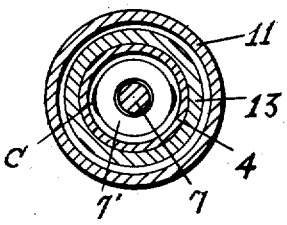
Fig. 7 is a sectional view taken on line 7—7 in Fig. 5.
Figure 8:
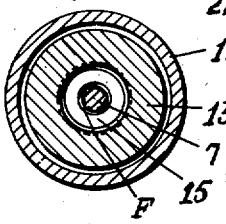
Fig. 8 is a sectional view taken on line 8—8 in Fig. 5.
Figure 9:
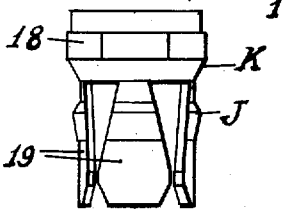
Fig. 9 is an elevation of the anchor fitting for the choke mechanism and binder for the cups on the choke barrel.
Figure 10:
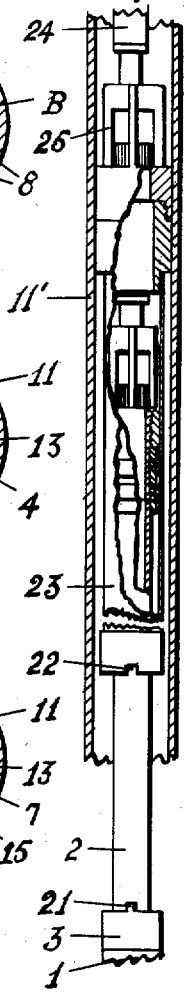
Fig. 10 is a sectional view through the oil conductor tubing illustrating a preferred pump arrangement.

It will be seen that section 12 from near the longitudinal center thereof to its lower end is reduced in diameter externally to receive a collar 16 slidably fitting thereon as separating means for a pair of flexible cups 17, one for each end thereof, and clamped thereby as fluid tight sealing means for the lower section in said sleeve 11, and the said collar and cups above referred to being secured by a fitting 18 threadedly engaging in the lower end of said section 12, as shown in Fig. 5, said fitting functioning as an anchor against free longitudinal movement of the above described choke structure, and furthermore to restrict rotation thereof for longitudinal adjustment of the needle valve structure, which is accomplished by turning movement of section 1, later described.

Attention is further directed to the structure of said fitting which has its lower tubular wall portion subdivided into a plurality of sectors 19, and being spaced apart sufficiently for each to flex radially as forced into or withdrawn from the lower end of said sleeve 11, it being understood that the lower end of said sleeve is of greater thickness, extending inward for a short distance upward, and in which is formed an annular depression H in which will seat an outward extension J externally positioned on each of said sectors, as a retainer against free withdrawal, as above stated. There is also formed on the threaded head portion of the fitting a shoulder K as a stop against further downward movement of the choke barrel when assembling the structure in a well, and the sectors, being spaced apart, and the lower corner of each converging, is means to selectively straddle a pin 20 radially extending inward and secured to the wall of sleeve 11, whereby the choke structure, except its upper section 1, is retained against rotation at the time of adjusting the needle valve opening, which is accomplished by turning section 1 as threadedly engaged, to move the needle longitudinally.

Figure 2:
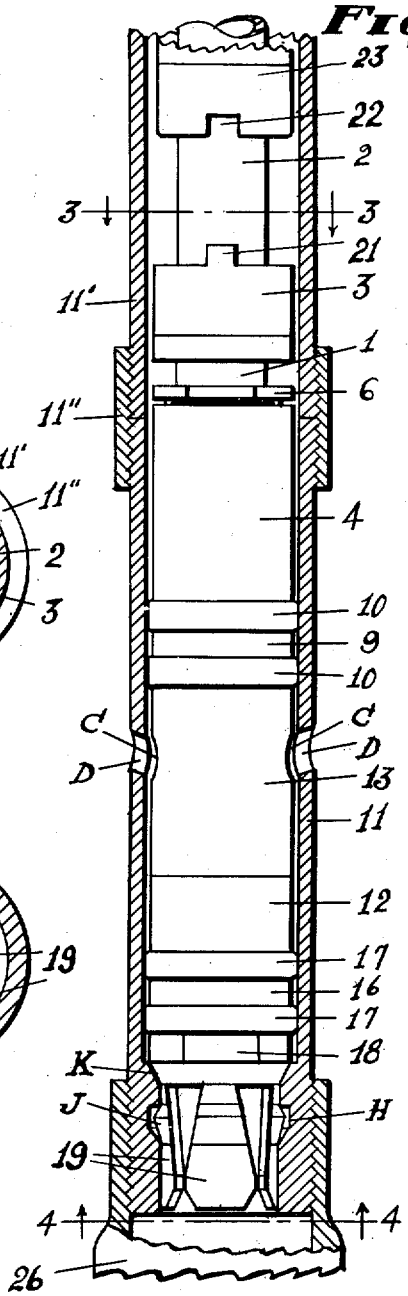
Fig. 2 is an enlarged sectional view of the lower portion of the oil conductor tubing and sleeve which contains the choke mechanism.

To turn section 1, it will be seen that its coupling 3 has a lug 21 upwardly extending and adapted to seat in a notch 22 arranged therefor in the lower end of the pump sleeve 23, as shown in Fig. 2, said sleeve to engage slidably on the said pull tube 2, by which arrangement, when the sleeve is dropped to engagement with the lug, it is turned sufficiently for the notch and lug engagement, and when so connected, the turning movement is through the medium of a pump rod 24 that is secured to the cage 25 of the pump sleeve, said rod extending upward and outward at the top of the well, and to be turned by an appropriate tool to adjust the needle valve.

To clarify the purpose of the ports and choke arrangement heretofore referred to it is now stated that the ports will function as an overflow for the oil from the well into the reservoir, the height of the fill being governed by the oil rock pressure of the well but restricted to a given rate of flow by the needle valve, in other words, the said needle valve may be closed sufficiently to restrict the flow to a desired number of barrels per period of time; for example, the valve may be set for a supply of forty barrels per twenty-four hours, and at such termination of time the oil is promptly pumped from the reservoir, the oil returning to the choke barrel structure and rising therein responsive to removal of oil through the conductor tubing by the pump. When the said amount is exhausted the pump will cease to work since the rate of oil flow through the choke is insufficient to supply the pump at the pumping rate thereof. The pump is shut down and must remain idle for the next succeeding quantity to flow through the choke into the reservoir. It will be seen that the needle valve as adjusted will permit only forty barrels of production per each twenty-four hour period of time.

It will be understood that the pump sleeve, pull tube and pump rod are of conventional type commonly employed in oil well pumping devices, and such I do not claim broadly; also a packing element 26 extending downward and being carried by sleeve 11 in sealing contact with the oil well casing to form a bottom for the reservoir is another conventional element associated with oil pumpers, the function of which is well known in the art, as well as the pump sleeve above referred to.

While I have shown certain novel arrangements to connect the members of the choke structure, I do not wish to be restricted to such alone, as other connecting fluid tight means may be adopted, and such other modifications may be employed as lie within the scope of the appended claims.

Having fully described my invention what I claim as new and desire to secure by Letters Patent is:

1. In a controlled pumping choke for oil wells, a choke structure of the class described, a reservoir surrounding said choke structure, said choke structure comprised of a jointed hollow choke barrel and a sleeve in which the choke barrel is inserted, one portion of the jointed barrel being secured fluid tight and against rotation in the sleeve, while the other portion is adapted to revolve and move longitudinally, a needle valve positioned in the hollow of the choke barrel, means at the lower end of the movable portion to which the needle valve is secured, said valve being adjustably opened and closed by the movable portion of the barrel as the movable portion is moved longitudinally, and the said wall of the sleeve and choke barrel having ports oppositely disposed communicating with the reservoir.

2. In a controlled pumping choke for oil wells, in combination with the pump structure of an oil well, said choke structure comprised of a plurality of sections threadedly connected functioning as a barrel and a sleeve to receive the choke structure fluid tight, a fitting having sectors integrally jointed to a threaded head portion of the fitting, said fitting to threadedly engage firmly on the lower extremity of the choke barrel, and each sector having an extension externally and the sleeve having an annular groove internally to receive the extension of the sector seating therein as an anchor against longitudinal movement of the barrel, a pin spaced upward from the lower end of the sleeve and extending inward thereof to engage between the sectors to avoid rotation of a lower section of the barrel, a needle valve comprised of a needle and means to secure one end to an upper section of the barrel, a head axially bored and carried by a lower section of the barrel, said last section stationarily arranged, while the upper section carrying the needle is adapted to turn, moving the needle longitudinally, and the free end of the needle being tapered to conform to the bore in said last named head and to move to and from engagement therewith by turning movement of the upper section, there being a pump mechanism comprised of a sleeve and a pull tube, the pull tube being connected to the upper section of the choke barrel, the sleeve having a rod upwardly extending and there being secured thereto as reciprocating longitudinal movement and turning movement therefor, means to connect the lower end of the sleeve to the upper end of the revolving section of the choke barrel structure as turning means therefor by the rod secured to the sleeve, and the said first named sleeve and choke barrel having ports in registry and oppositely disposed for external communication.

3. In a controlled pumping choke for oil wells, as recited in claim 2, the needle carrying section being apertured plurally and through which oil will flow as drawn by the pump.

4. In a controlled pumping choke for oil wells, a sleeve having a packing element threadedly connected to one end thereof and means to connect the other end of sleeve to conductor tubing, a hollow barrel insertible in the sleeve, the barrel being jointed and threadedly connected to vary the length thereof by turning movement of one portion at the joint, the other portion being rigidly secured in the sleeve, a needle structure carried axially by an apertured head in the revolving portion of the barrel, and an axially bored head for the needle carried by the stationary portion of the barrel and a bored washer to guide the free end of the needle as it moves into and from the bore of the head, and the wall of the sleeve and barrel having ports oppositely disposed and being adjacent said washer with respect to the diametrical axis of the ports all as and for the purpose specified.

5. In a controlled pumping choke for oil wells, the oil well having a casing and tubing in the casing of a lesser diameter to provide an annular reservoir between the tubing and the casing, there being a pull tube within the said tubing, the pumping choke comprising a sleeve and means to connect the sleeve to the said tubing, a packing element secured to the other end of the sleeve, a hollow barrel comprised of upper and lower members threadedly connected to move said members longitudinally toward and from each other, the lower member having a head intermediate of its length with a conical bore axially extending therethrough to pass well liquid through the hollow barrel for flow into the pull tube, the upper member carrying a conical pointed needle to engage in the bore, a fitting secured to the lower barrel member, the lower end of the fitting being divided into four sectors spaced apart, and a lug radially positioned on the lower end of the sleeve to engage between the sectors selectively to avoid turning of the lower barrel member, the pull tube being secured to the upper barrel member through the medium of a coupling, the coupling having a lug extending from its upper end in parallelism with the axis, a pump sleeve telescopically engaging on the pull tube, the pump sleeve having a notch in the wall thereof to engage with the lug on the coupling as turning means for the said upper barrel member, the walls of the sleeve and barrel being bored in registry as an exit for the flow of oil into and from the reservoir, the said pump sleeve having a pump rod secured to its upper end, said rod protruding upward and outward of the well by which means the pump sleeve is turned to raise and lower the needle whereby the flow of oil is controlled through the bored head carried by the lower barrel member.

6. In a well pumping apparatus including a casing, tubing within the casing and cooperating therewith in forming a storage space for well liquid between the tubing and casing and having an opening for connecting the interior of the tubing with said storage space and wherein well liquid is adapted to flow responsive to well pressure, a packer on the tubing having sealing engagement with the casing to form a liquid-tight bottom for said storage space, a pump removably supported in the tubing and having a flow connection with the storage space for pumping well liquid from said storage space, a choke barrel in the tubing having a passage in connection with the opening in the tubing for conducting the well fluid into the storage space, packing means removably sealing the choke barrel on the upper and lower sides of said opening and a choke in the choke barrel for controlling flow of well liquid into the storage space under well pressure, and a pull member connecting the choke barrel with a part of the pump to effect removal of the choke barrel and the choke therein from the tubing upon removal of the pump.

7. In a well pumping apparatus including a casing, tubing within the casing and cooperating therewith in forming a storage space for well liquid between the tubing and casing and having an opening for connecting the interior of the tubing with said storage space and wherein well liquid is adapted to flow responsive to pressure, a packer on the tubing having sealing engagement with the casing to form a liquid-tight bottom for said storage space, a pump removably supported in the tubing for pumping well liquid from said storage space, a choke barrel removably supported in the tubing and having an opening connected with the tubing opening, a pull tube connected with the choke barrel and forming a flow connection from the storage space to the pump, a choke located in the choke barrel on the pressure side of said openings for controlling flow of well liquid through the choke barrel into the storage space and for effecting withdrawal of the well liquid from the storage space by the pump during operation of the pump, and a baffle located between the choke and the pump.

8. In a well pumping apparatus including a casing, tubing within the casing and cooperating therewith in forming an annular storage space for well liquid between the tubing and casing and having an opening for connecting the interior of the tubing with said storage space and wherein well liquid is adapted to flow responsive to well pressure, a pump removably supported in the tubing for pumping well liquid from said storage space, a choke barrel in the tubing having an opening in connection with the opening in the tubing, a choke supported in the barrel on the pressure side of said openings for permitting flow of well liquid under well pressure from a point below the choke through the choke barrel into said storage space by way of said openings, said pump having flow connection with the choke barrel above said choke whereby the well fluid is drawn by the pump from the storage space, sealing means between the choke barrel and tubing on the upper and lower sides of said openings, and means connecting the pump with the choke barrel for effecting removal of the choke barrel including the choke therein upon removal of the pump.

9. In a well pumping apparatus including a casing, tubing within the casing and cooperating therewith in forming a storage space for well liquid between the tubing and casing and having an opening for connecting the interior of the tubing with said storage space and wherein liquid is adapted to flow responsive to pressure, a pump removably supported in the tubing for pumping well liquid from said storage space, a choke barrel in the tubing having an opening in connection with the opening in the tubing, a choke supported in the barrel on the pressure side of said openings for permitting flow of liquid under pressure from a point below the choke into said storage space, sealing means between the choke barrel and tubing on the upper and lower sides of said openings, a pull tube connected with the choke barrel and forming a flow connection with the pump above said choke whereby liquid moved by the pump is drawn from the storage space, and means on the pull tube engageable with the pump for effecting removal of the choke barrel including the choke therein upon removal of the pump.

10. In a well pumping apparatus including a casing, tubing within the casing and cooperating therewith in forming a storage space for well liquid between the tubing and casing and having an opening for connecting the interior of the tubing with said storage space and wherein well liquid is adapted to flow under pressure, a packer on the tubing having sealing engagement with the casing to form a liquid-tight bottom for said storage space, a pump removably supported in the tubing and having flow connection with said opening for pumping well liquid from said storage space, a choke located in the tubing on the pressure side of said opening for admitting flow of well liquid into the storage space and for restricting flow of well liquid under said pressure during operation of the pump whereby the liquid moved by the pump is drawn through said flow connection from the storage space, and an anchor for securing the choke in the tubing.

11. In a well pumping apparatus including a casing, a tubing within the casing and cooperating therewith in forming a storage space for well liquid between the tubing and casing and having an opening for connecting the interior of the tubing with the storage space, a pump removably supported in the tubing, a choke barrel in the tubing having an opening in connection with the opening in the tubing and formed of threadedly engaged sections, a flow connection between the choke barrel and pump for flow of well liquid from the storage space, a valving member carried by one of said sections, a seat member carried by the other section and having a port for passing a predetermined flow volume of well liquid into the storage space, packing elements between the tubing and choke barrel on the respective upper and lower sides of said opening, and means on said pump for engaging one of said barrel sections whereby said barrel section is adapted to be rotated for adjusting relative position of the valving member and seat member.

12. In combination with a well pumping apparatus including a casing, a tubing within the casing and cooperating therewith in forming an annular storage space for well liquid between the tubing and casing and having an opening for connecting the interior of the tubing with the storage space, a pump removably supported in the tubing, a choke barrel in the tubing having an opening in connection with the opening in the tubing and formed of threadedly engaged sections, a valving member carried by one of said sections, a seat member carried by the other section and having a port for passing a predetermined flow volume of well liquid into the choke barrel and into the storage space, packing elements between the tubing and choke barrel on the respective upper and lower sides of said opening, means on said pump for engaging one of said barrel sections whereby said barrel section is adapted to be rotated for adjusting the valving member relative to said seat, a pull tube connected with the choke barrel and forming a flow connection between the choke barrel and pump above said seat member whereby the pump draws well liquid from the storage space, and means on the pull tube engageable by the pump for effecting removal of the choke barrel.

CLARENCE M. WILLIAMS.